US012688102B1

(12) United States Patent
Pan et al.

(10) Patent No.: US 12,688,102 B1
(45) Date of Patent: Jul. 21, 2026

(54) THREAD DATA RACE DETECTION AND SYNCHRONIZATION FOR PARALLEL IMPLEMENTATION OF VERIFICATION TESTBENCHES

(71) Applicant: Synopsys, Inc., Mountain View, CA (US)

(72) Inventors: Dawei Pan, Hopkinton, MA (US); Vivek Gaur, Shrewsbury, MA (US)

(73) Assignee: Synopsys, Inc., Sunnyvale, CA (US)

( * ) Notice: Subject to any disclaimer, the term of this patent is extended or adjusted under 35 U.S.C. 154(b) by 738 days.

(21) Appl. No.: 18/101,024

(22) Filed: Jan. 24, 2023

(51) Int. Cl.
*G06F 11/27* (2006.01)
*G06F 11/263* (2006.01)
(52) U.S. Cl.
CPC ............ *G06F 11/27* (2013.01); *G06F 11/263* (2013.01)

(58) Field of Classification Search
USPC ........................................................ 716/106
See application file for complete search history.

(56) References Cited

U.S. PATENT DOCUMENTS

2006/0075367 A1 * 4/2006 Chan .............. G01R 31/318314
716/108

* cited by examiner

*Primary Examiner* — Bryce M Aisaka
(74) *Attorney, Agent, or Firm* — Fenwick & West LLP

(57) ABSTRACT

A testbench for a design under test (DUT) includes components used to verify functionality of the DUT through simulation of the DUT. The components are grouped into component groups, and the components within an individual component group are executed on a same thread of the simulation. The component groups are also executed on a single thread, which includes logging accesses to memory by different component groups. Based on the logged memory accesses, a processing device identifies whether any component groups create a thread data race. An action is taken in response to identifying thread data races.

20 Claims, 11 Drawing Sheets

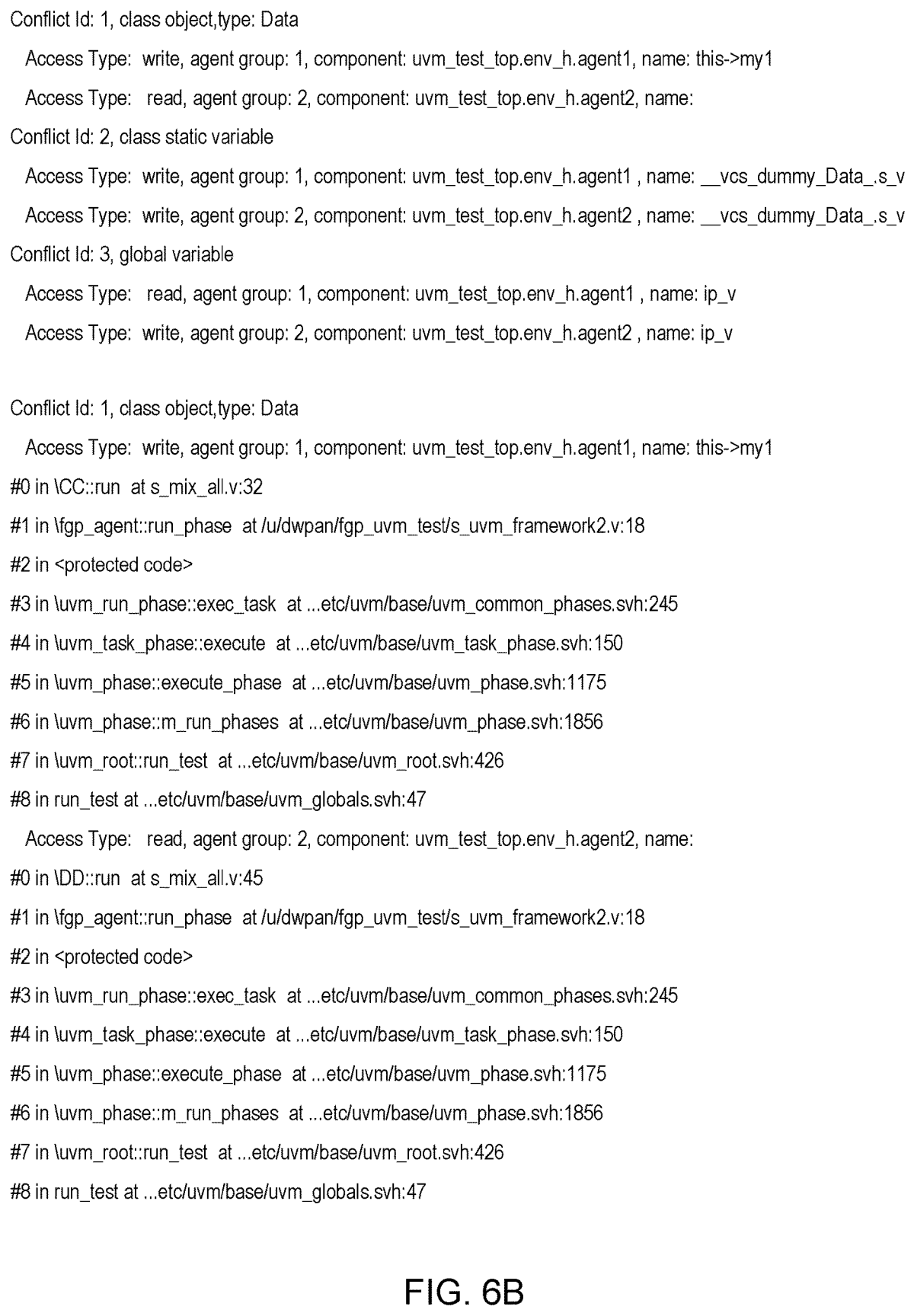

Conflict Id: 1, class object,type: Data

Access Type:　write, agent group: 1, component: uvm_test_top.env_h.agent1, name: this->my1

Access Type:　read, agent group: 2, component: uvm_test_top.env_h.agent2, name:

Conflict Id: 2, class static variable

Access Type:　write, agent group: 1, component: uvm_test_top.env_h.agent1 , name: __vcs_dummy_Data_.s_v Access Type:　write, agent group: 2, component: uvm_test_top.env_h.agent2 , name: __vcs_dummy_Data_.s_v Conflict Id: 3, global variable Access Type:　read, agent group: 1, component: uvm_test_top.env_h.agent1 , name: ip_v Access Type:　write, agent group: 2, component: uvm_test_top.env_h.agent2 , name: ip_v Conflict Id: 1, class object,type: Data Access Type:　write, agent group: 1, component: uvm_test_top.env_h.agent1, name: this->my1

0 in \CC::run  at s_mix_all.v:32

1 in \fgp_agent::run_phase  at /u/dwpan/fgp_uvm_test/s_uvm_framework2.v:18

2 in <protected code>

3 in \uvm_run_phase::exec_task  at ...etc/uvm/base/uvm_common_phases.svh:245

4 in \uvm_task_phase::execute  at ...etc/uvm/base/uvm_task_phase.svh:150

5 in \uvm_phase::execute_phase  at ...etc/uvm/base/uvm_phase.svh:1175

6 in \uvm_phase::m_run_phases  at ...etc/uvm/base/uvm_phase.svh:1856

7 in \uvm_root::run_test  at ...etc/uvm/base/uvm_root.svh:426

8 in run_test at ...etc/uvm/base/uvm_globals.svh:47

Access Type:　read, agent group: 2, component: uvm_test_top.env_h.agent2, name:

0 in \DD::run  at s_mix_all.v:45

1 in \fgp_agent::run_phase  at /u/dwpan/fgp_uvm_test/s_uvm_framework2.v:18

2 in <protected code>

3 in \uvm_run_phase::exec_task  at ...etc/uvm/base/uvm_common_phases.svh:245

4 in \uvm_task_phase::execute  at ...etc/uvm/base/uvm_task_phase.svh:150

5 in \uvm_phase::execute_phase  at ...etc/uvm/base/uvm_phase.svh:1175

6 in \uvm_phase::m_run_phases  at ...etc/uvm/base/uvm_phase.svh:1856

7 in \uvm_root::run_test  at ...etc/uvm/base/uvm_root.svh:426

8 in run_test at ...etc/uvm/base/uvm_globals.svh:47

FIG. 6B

THREAD DATA RACE DETECTION AND SYNCHRONIZATION FOR PARALLEL IMPLEMENTATION OF VERIFICATION TESTBENCHES

TECHNICAL FIELD

The present disclosure relates to simulation for functional verification and, more particularly, to parallel implementation of testbenches for functional verification.

BACKGROUND

A testbench is one method for verifying the function of an integrated circuit design, commonly referred to as a device under test or design under test (DUT). The testbench provides different stimuli to be applied to the DUT. Operation of the circuitry in response to the stimuli is simulated. The resulting circuit responses are captured and analyzed or compared to the expected responses. For example, Universal Verification Methodology (UVM) is a standardized methodology for testbenches.

However, functional verification can take a long time. There can be a large number of modules within the DUT to be tested, and a large number of components within the testbench to perform various types of tests. If the testbench components are run serially, the overall run time can be long. The run time can be reduced if the testbench components could be run in parallel. However, existing methods of supporting fine-grained parallelism of simulation are not suitable for UVM and other testbenches implemented by System Verilog and other object-oriented programming languages. For example, there are known challenges to analyzing data dependence in object-oriented languages.

SUMMARY

In some aspects, a testbench for a design under test (DUT) includes components used to verify functionality of the DUT through simulation of the DUT. The components are grouped into component groups, and the components within an individual component group are executed on a same thread of the simulation. The component groups are also executed on a single thread, which includes logging accesses to memory by different component groups. Based on the logged memory accesses, a processing device identifies whether any component groups create a thread data race. An action is taken in response to identifying thread data races.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 6B is a thread data race report in accordance with some embodiments of the present disclosure.

DETAILED DESCRIPTION

Part I

Figure 1:
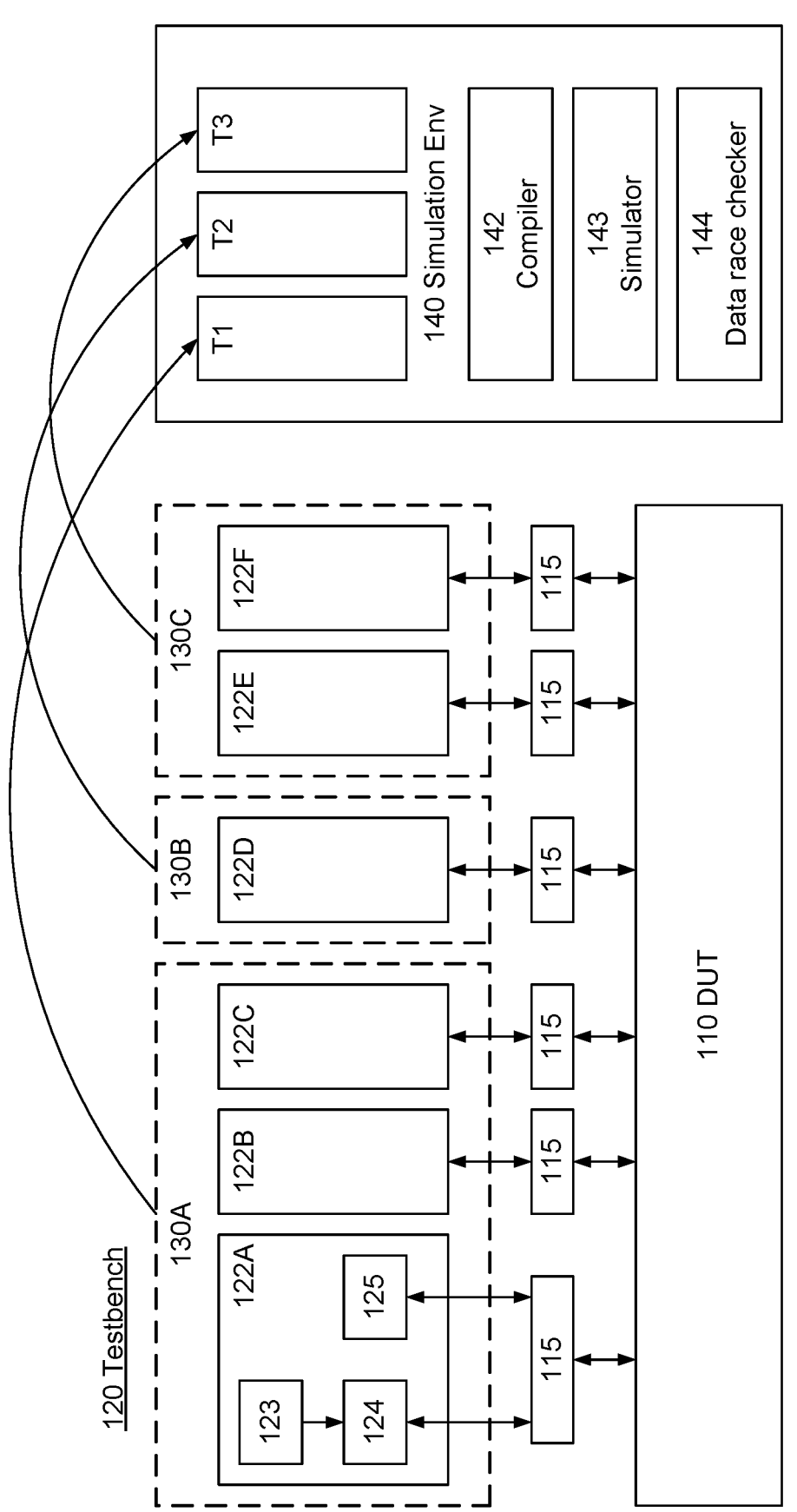
FIG. 1 is a block diagram of a test environment using a UVM testbench in accordance with some embodiments of the present disclosure.

Aspects of the present disclosure relate to thread data race detection and synchronization for parallel implementation of verification testbenches. Part I describes these and Part II contains code listings referenced in Part I.

Functional verification is a step in the design of integrated circuits. Testbenches, such as those based on the UVM standard, provide an environment for the functional testing of circuit designs. The testbench provides different stimuli to be applied to the design under test (DUT) and then captures the resulting responses. However, the number of tests used to verify the function of a DUT can be large and executing the tests serially can take a long time.

One approach to speed up functional verification is to dispatch different software events to multiple threads that execute in parallel. However, data integrity is an issue that may arise in such situations, for example if one thread writes to a memory address that is concurrently accessed by a different thread. Furthermore, many testbenches are implemented in System Verilog, which is an object-oriented programming language. There are known challenges to analyzing the data dependence of object-oriented languages due to their features of polymorphism and dynamic binding.

Thread safety is one aspect of data dependence that is applicable to multi-threaded (parallel) programs. A piece of code is thread-safe if it functions correctly during the execution of other threads. Conversely, a thread data race exists if concurrently executing threads access the same data in a conflicting manner. For example, if one thread writes to a variable while another concurrent thread reads that variable, then the reading thread will not know whether it has read the correct value of the variable. Therefore, a thread data race checker tool that can detect thread data races within a testbench is important to parallelizing the testbench.

In one aspect, thread data race checking is performed in a race checker mode. The testbench includes many components used to verify the function of the DUT. For example, a UVM testbench may include agents, sequencers, drivers and monitors written in System Verilog. Components are grouped together to run in the same thread. These are referred to as component groups. In a parallel mode of operation, different component groups may be dispatched to different threads. However, in the race checker mode, the components groups are run on a single thread. The single-thread simulation also logs memory accesses, by memory address and by component group. These logged memory accesses may then be used to detect possible thread data races, for example if the same memory address is accessed by different component groups. Once detected, various actions may be taken to report and/or correct the thread data races. Whether the simulation is run in race checker mode or parallel mode may be determined by a flag(s). For example, setting a race checker flag runs the race checker mode, including activating the logging of memory accesses.

Technical advantages of the present disclosure include, but are not limited to, the following. First, detecting thread data races is important to parallelizing a testbench. Successful detection of thread data races allows for correction, which addresses one potential obstacle to parallel implementation of a testbench. Parallelization is beneficial because it reduces the runtime to complete a certain number of verification tests, thus reducing the overall design time.

Another advantage is that this approach can produce a complete report of possible thread data races after a single round of simulation. In contrast, if thread data races are detected by running the testbench on multiple threads, the occurrence of a thread data race may result in termination of the simulation due to the thread data race conflict. If that happens, later thread data races will not be detected until after the current thread data race is resolved and then the simulation is repeated and runs past the current point. Detecting thread data races in this way may require many rounds of simulation, which is time consuming and a repetitive use of resources as simulations are run multiple times.

The following examples are based on a UVM testbench, although other types of testbenches may also be used. FIG. 1 is a block diagram of a test environment using a UVM testbench in accordance with some embodiments of the present disclosure. The DUT 110 may be described in a hardware description language, such as Verilog. The testbench 120 is used to verify whether the DUT 110 functions as expected.

The testbench 120 includes many components. Components may include software objects that operate on and/or process data and transactions as part of the testbench. Different components may perform different tasks in order to implement the testbench. UVM components include agents 122, which may include sequencers 123, drivers 124 and monitors 125. The components and their hierarchy may be captured in a UVM component tree. The testbench 120 communicates with the DUT 110 via interfaces 115. In the UVM framework, agents 122 are used to test specific functions of the DUT 110. Within each agent, the sequencer 123 generates the different test stimuli, the driver 124 applies these to the DUT 110, and the monitor 125 collects the DUTs response. These responses may be analyzed or compared to expected responses by other components within the testbench 120. UVM components may be written in System Verilog, which is an object-oriented language.

The test environment also includes a simulation environment 140, which carries out the simulation of the DUT 110. The functions of the simulation environment 140 include a compiler 142, a simulator 143 and a thread data race checker 144. These are implemented as software instructions executed by a processing device. The compiler 142 compiles the DUT 110 and testbench 120 into executable code. The simulator 143 runs the executable code to carry out the simulation. FIG. 1 shows a multi-threaded simulation. The simulation of the testbench components (e.g., UVM sequencers, drivers and monitors) generate events, and these events may be run in parallel on different threads Tn. The thread data race checker 144 is used to detect thread data races between different threads, as described in more detail below.

The testbench 120 groups the components into component groups 130, as shown by the dashed lines. All of the components and corresponding events within a component group 130 are executed on a same thread of the simulation, but components and events from different component groups 130 may be executed on different threads. The component groups may be expressly specified, such as in a configuration file provided by the user. Code listing 1 (listed in Part II) is an example format for such a configuration file. Only the top components need be specified. Child components inherit the component group attributes from the parent component. In Code listing 1, exclusive component means that the component does not belong to any component group. It will always be executed serially. If there is no configuration file or the user does not specify component groups, then each UVM agent may default to a separate component group. This default may be captured in a configuration file that is automatically generated.

In FIG. 1, component group 130A includes agents 122A-C and all of their sub-components (sequencers, drivers and monitors) and the events from this component group 130A are executed on thread T1. Component group 130B includes agent 122D and is executed on thread T2. Component group 130C include agents 122E-F and is executed on thread T3.

The testbench 120 may be run in parallel mode or in race checker mode. In parallel mode, the testbench performs verification of the DUT using multiple threads, as shown in FIG. 1. In race checker mode, which is described in more detail below, the testbench is run to detect possible thread data races between the current component groups. For example, there will not be a thread data race between the components in agents 122A-C because they will always run on the same thread since they are in the same component group. However, there could be a thread data race between components in component group 130A versus component groups 130B,C because they could be run on different threads.

Figure 2:
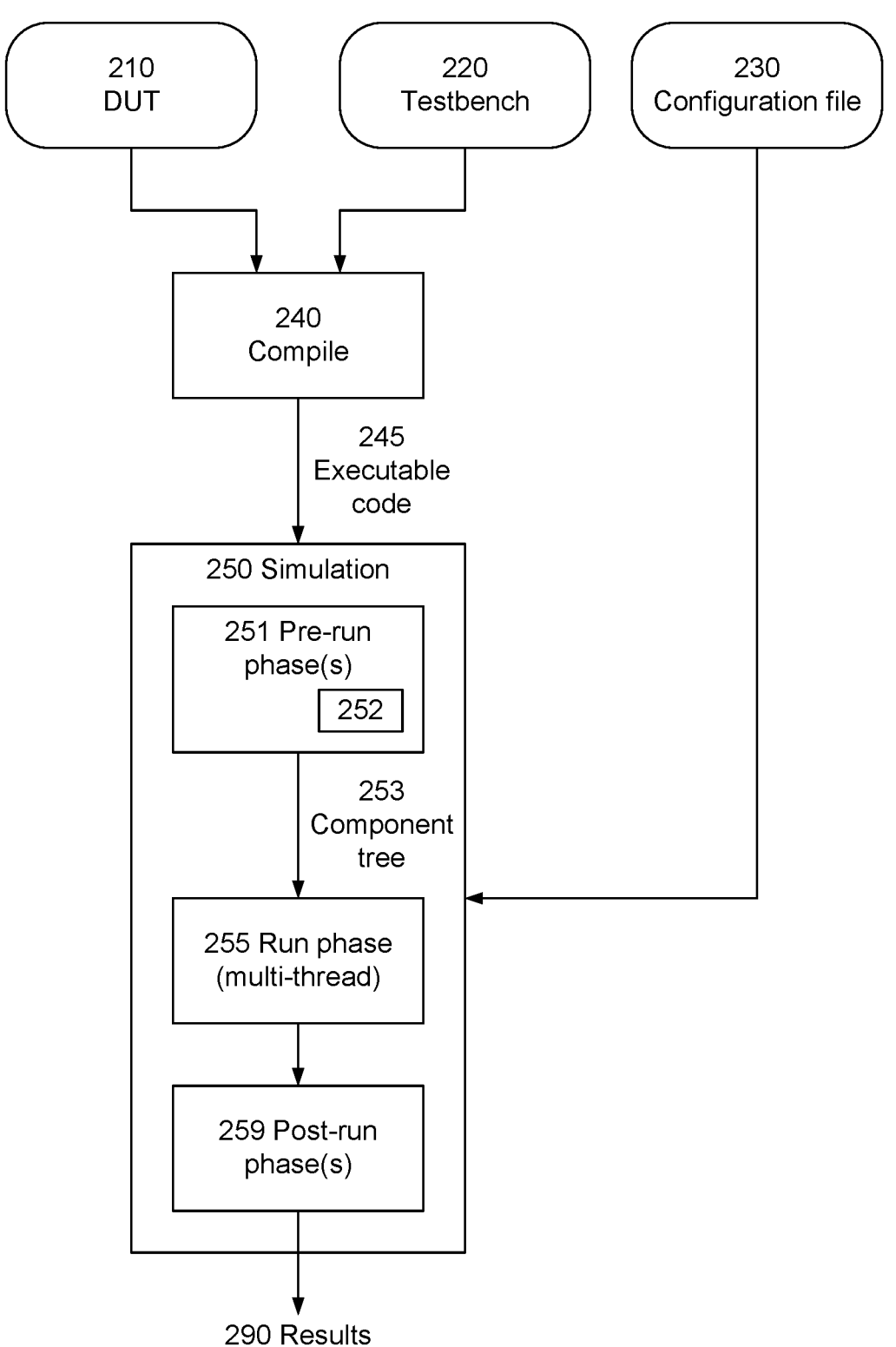
FIG. 2 is a flow diagram of a parallel mode in accordance with some embodiments of the present disclosure.

FIG. 2 is a flow diagram of operation of the simulation environment 140 in parallel mode in accordance with some embodiments of the present disclosure. The DUT 210 and testbench 220 are inputs to the simulator. Configuration file 230 specifies the component groups. At 240, the compiler 142 compiles the DUT 210 and testbench 220 into executable code 245. At 250, the simulator 143 runs the executable code on multiple threads. This may be divided into different phases, where the run phase 255 is the phase that actually carries out the multi-threaded simulation of the DUT. The phases before the run phase 255 will be referred to as pre-run phases 251, and the phases after the run phase 255 will be referred to as post-run phase(s) 259.

In the UVM model, the pre-run phases 251 may include build, connect, end_of_elaboration and start_of_simulation phases. The build phase is used to build testbench components and create their instances. The connect phase is used to connect between different testbench components. The end_of_elaboration phase is used to display UVM topology and other functions required to be done after connection. The start_of_simulation phase is used to set initial run-time configuration or display topology.

In the UVM model, the post-run phases 259 may include extract, check, report and final phases. The extract phase is used to extract and compute expected data from a scoreboard within the testbench. The check phase is used to perform scoreboard tasks that check for errors between expected and actual values from the DUT. The report phase is used to display results from checkers, or summaries of other test objectives. The final phase is used to do final operations before exiting the simulation.

In FIG. 2, the pre-run phases 251 include an initialization phase 252. It may be implemented in the UVM library as shown in Code listing 2. In this fine-grained parallelism (FGP) initialization phase 252, the simulator iterates all the UVM components in the testbench 220 and passes component names and component parent-children relationships for use in the run phase 255. In Code listing 3, "uvm_fgpinit_phase::execute" is invoked by the UVM root component. Starting from the root component, "traverse_all_component" will iterate all its children and descendants. The Verilog system task $fgpUvmComponentInfo is implemented inside the simulator. It catches the UVM component's name, pointer address and its parent-child relationship. The simulator will then create its own UVM component tree 253. Based on this data structure, the simulator can annotate its UVM component tree 253 with the component group information provided in the configuration file 230.

Figure 3:
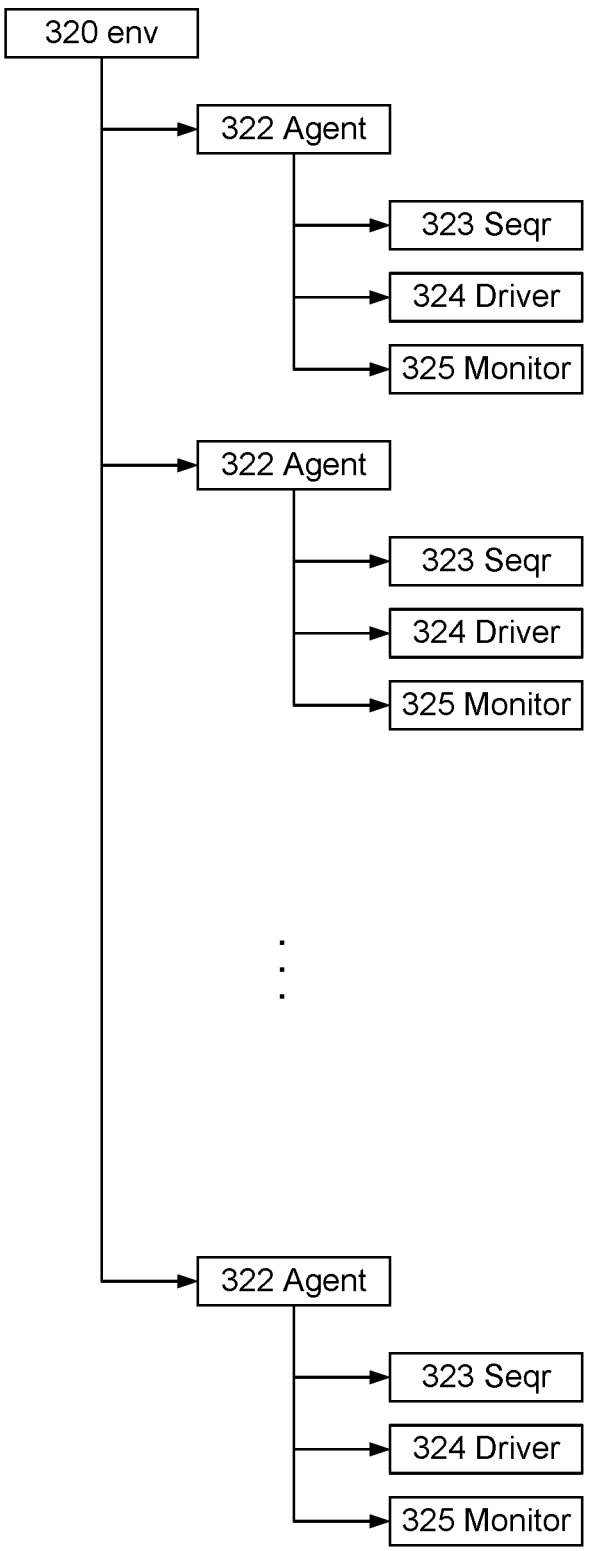
FIG. 3 is a block diagram of a UVM component tree in accordance with some embodiments of the present disclosure.

FIG. 3 is a block diagram of a UVM component tree corresponding to the example of FIG. 1. The root component is environment (env) 320. Children of the top component env are different agents 322. Children of the agents 322 are sequencers 323, drivers 324 and monitors 325. In the testbench 220, each node of the component tree is an object of system Verilog class uvm_component in Verilog. In component tree 253, each node is an object of C++ class FgpUvmComponent, shown in Code listing 4. This node is an abbreviated version of the nodes for the full component tree contained in the testbench 220. For example, this node includes pointers to the underlying components rather than the full code of the component itself. The node also includes parent/child relations to other nodes.

The run phase 255 iterates the components from component tree 253 and then calls "comp.run_phase(phase)," which runs the actual simulation of the DUT. To provide the capability to let "comp.run_phase(phase)" to be executed using multiple threads, the wrapper function "vcs_fgp_run_phase" is added for class uvm_component. Inside the class "uvm_run_phase", it will call "comp.vcs_fgp_run_phase(phase)".

Because it is invoked by a "fork" statement, it will generate an event inside simulation and these events could be dispatched and executed in threads. See Code listing 5. Without the "fork" statement, the caller and callee will be in the same thread and the caller always waits for the callee to complete. With the "fork" statement, the callee will be scheduled and then executed by a child thread and the current parent event waits for it to complete and continue. The same approaches could be applied to all other UVM phases, including reset, main, configure, etc.

In the run time of the simulation, "vcs_fgp_run_phase" is handled as follows. First, it passes the UVM component address to the simulator and, as described above, the simulator can determine its UVM component information and then its component group and then the thread index of the component group, i.e., which thread is executing events from that component group. The simulator will schedule the event into the corresponding thread events pool. When a thread executes, it will execute the events in its events pool and then delete the executed events from the pool. By this approach, the events of UVM components may be executed in multiple threads.

The vcs_fgp_run_phase in the master thread performs the following:

1. Pass the component address from UVM testbench to simulator
2. Get the component group from the annotated UVM component tree (253)
3. Get the thread index of the component group
4. Dispatch event of the component group into corresponding thread's event pool The vcs_fgp_run_phase in child threads performs the following:

1. Execute the event from the event pool. This is where the simulation takes place.
2. For all events forked by current event, maintain the same thread index Inside the simulator, all the events which are invoked from the vcs_fgp_run_phase will inherit its invoker's thread information. As a result, events from the same component will share the same thread information and will be dispatched and executed in the same thread.

For example, in Code listing 6, there are two main events: "t1" "t2", and each of them triggers another two events. Also, there are two component objects of class user_component. Thread Ids of component "component1" and "component2" are allocated in the FGP Initialization phase 252. For example, the thread Id of "user_component1" is T1, and the thread Id of "user_component2" is T2. Then this thread Id will be passed to all its sub-events, including events "t1" "t2" "t11" "t12" etc.

Figure 4:
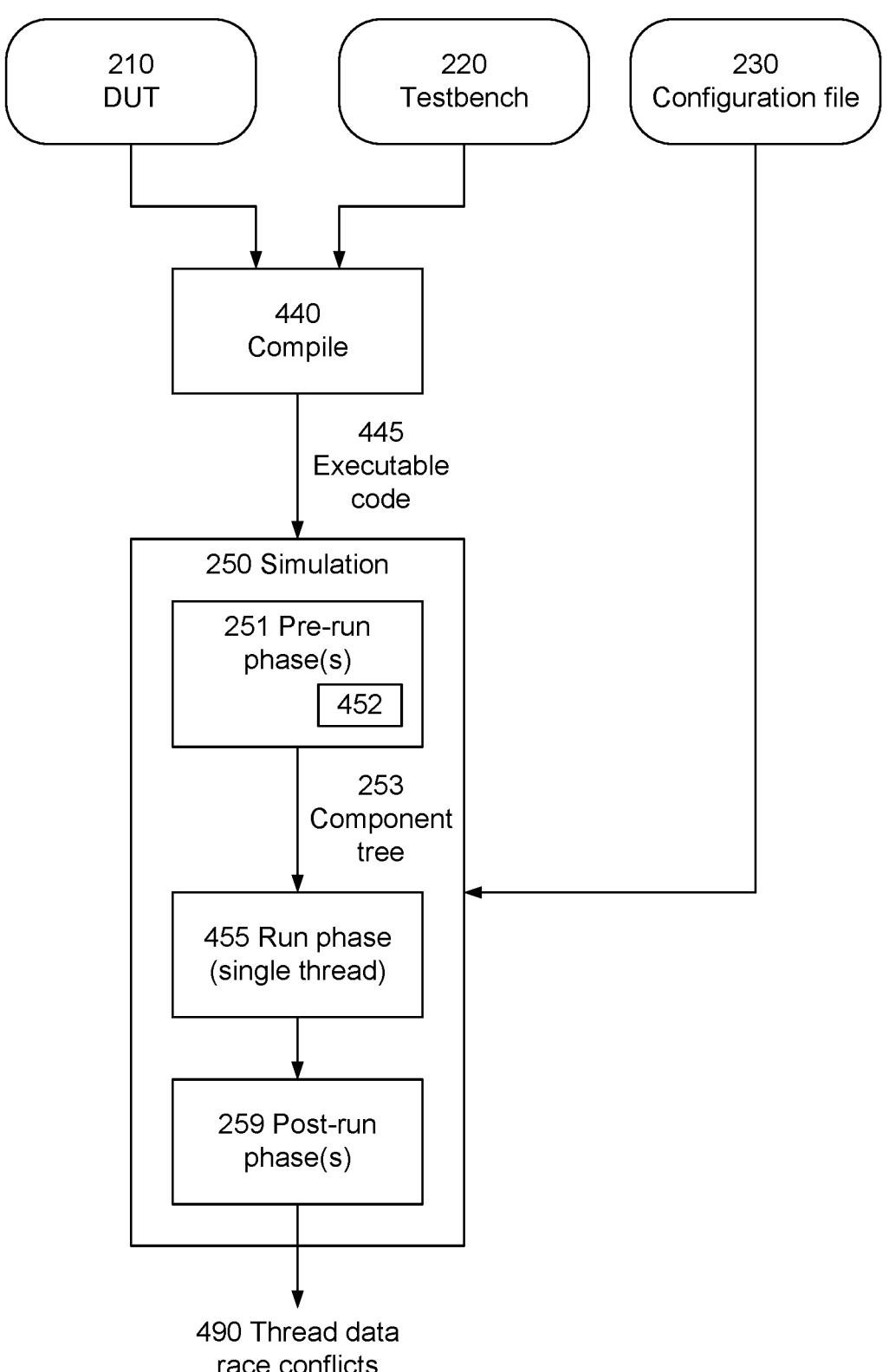
FIG. 4 is a flow diagram of a race checker mode in accordance with some embodiments of the present disclosure.

FIG. 4 is a flow diagram of operation of a simulation environment in race checker mode in accordance with some embodiments of the present disclosure. This flow is similar to the flow for parallel mode in FIG. 2. The primary difference is that the run phase 255 in FIG. 2 is multi-threaded based on the definition of component groups, but in FIG. 4 the run phase 455 is single-threaded but keeps track of the component groups. In one approach, the component group information is stored in a version of the component tree available during the run phase, referred to as a shadow component tree. Instead of dispatching and executing events in different threads, this flow keeps events in the master thread but maintains the component information for each event from UVM components inside the simulation. The single-threaded serial execution of FIG. 4 is used to mimic the parallel execution of FIG. 2 and to log memory accesses by different component groups. The compiler 440 adds some instrumentation to enable this. Even though the events are executed in the master thread, the simulator still can recognize the events' component information by the techniques described below. Various actions, examples of which are described below, may then be taken to address thread data race situations. One advantage of this flow is that there are no thread data race conflicts because there is only one thread. This avoids a situation where a thread data race results in unexpected termination of the simulation.

Figure 5A:
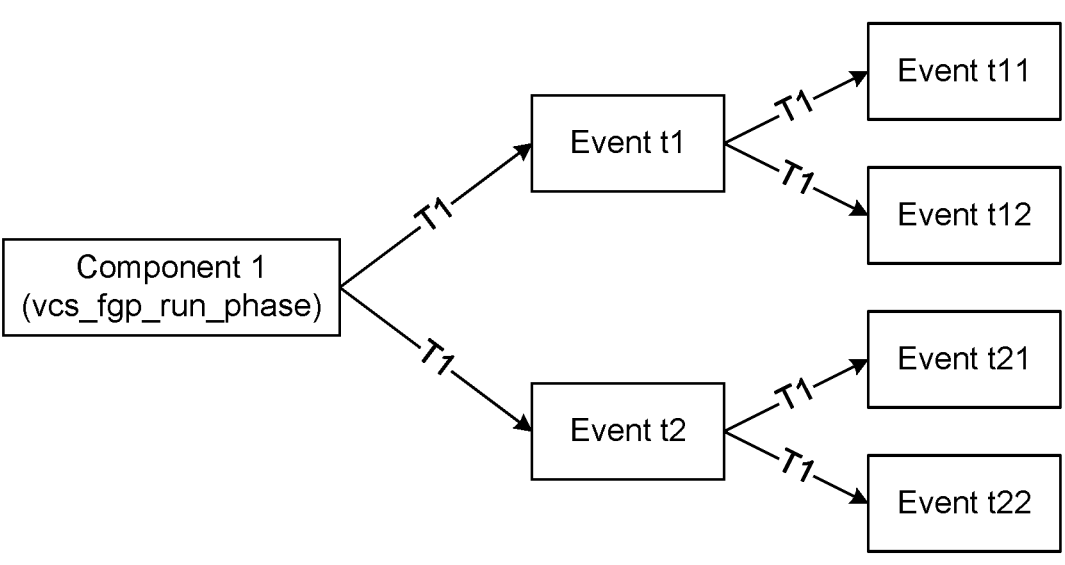
FIGS. 5A and 5B are diagrams illustrating a difference between parallel mode and race checker mode in accordance with some embodiments of the present disclosure.
Figure 5A:
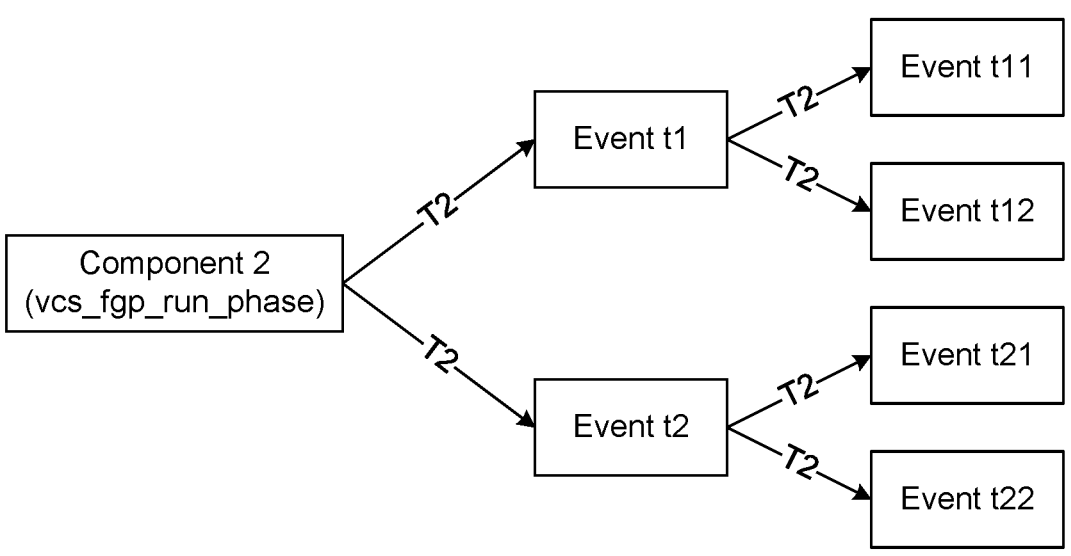
Figure 5B:
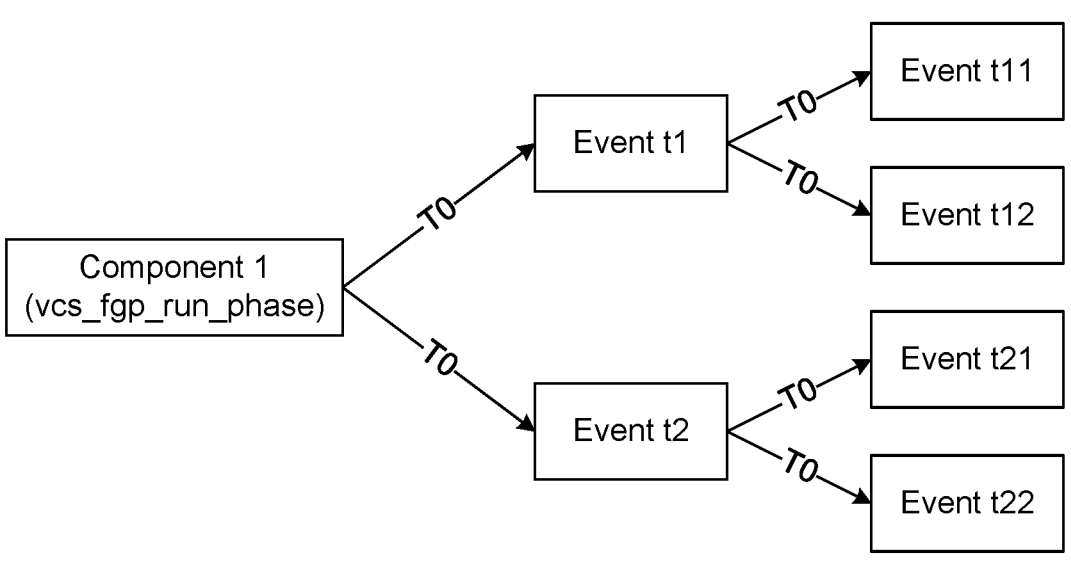
Figure 5B:
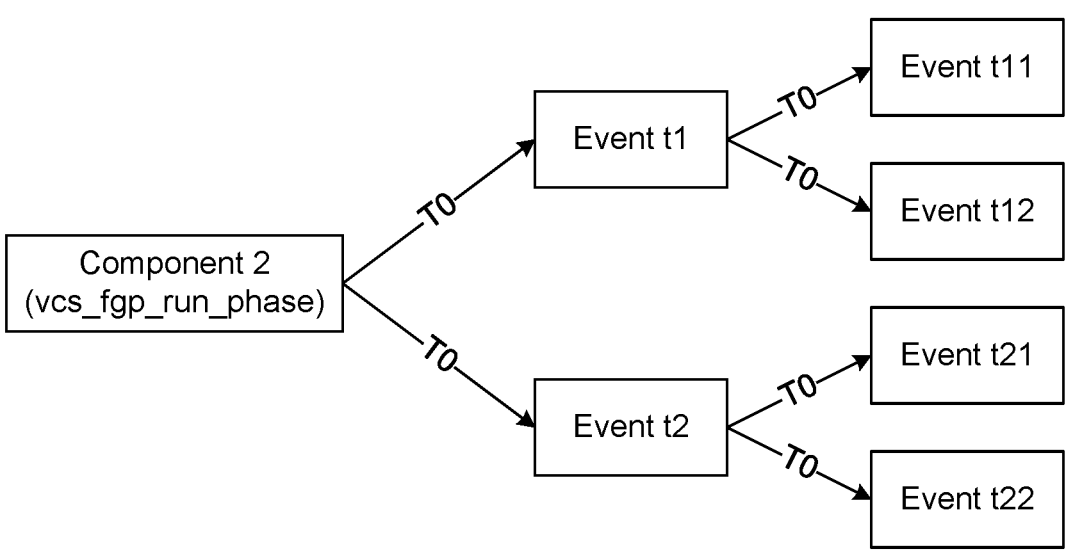

FIGS. 5A and 5B are diagrams illustrating a difference between parallel mode and race checker mode in accordance with some embodiments of the present disclosure. FIG. 5A illustrates events status in parallel mode. "component1" is executed in thread 1 (T1), and "component2" is executed in thread 2 (T2). FIG. 5B illustrates the events status in the race checker mode. Both "component1" and "component2" are executed in the master thread (T0).

At 440 of FIG. 4, the compiler adds instrumentation to log memory accesses. Assuming the function "CC::run_phase" may be called by the UVM testbench, the compiler may add the boldfaced instrumentation show in Code listings 7A-7C for static variables, global variables and class objects, respectively. In this example, class "CC" is inherited from uvm_component. Assume it is instantiated with two objects: "component1" and "component2." These two objects "component1.run_phase( )" and "component2.run_phase" could have a thread data race.

In the compiling phase 440 of the SystemVerilog design, the compiler of the simulator automatically instruments the extra line "$fgp_data_access" shown in bold in Code listings 7A-7C to log the data access for these items. The pointer of the address of the static variable, global variable or class object is passed as argument "$fgp_data_access."

Figure 5C:
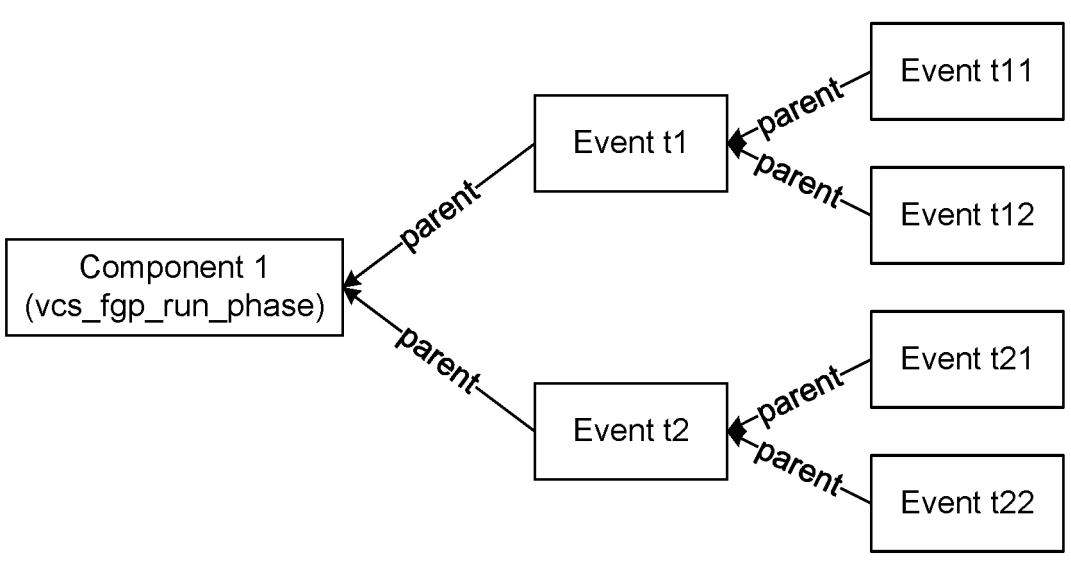
FIG. 5C shows parent-child relations between the events of FIG. 5B in accordance with some embodiments of the present disclosure.
Figure 5C:
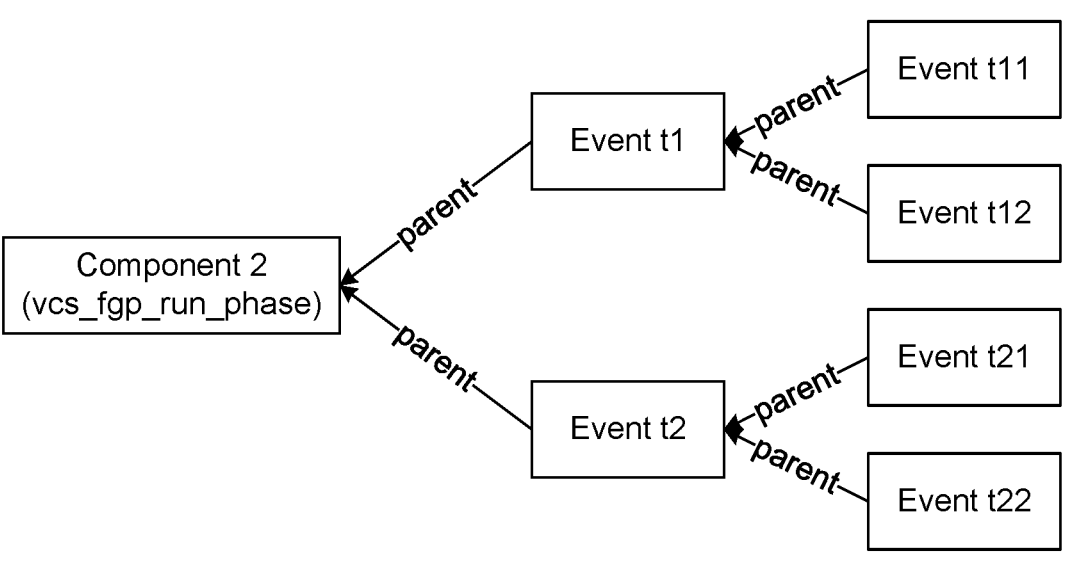

During the run phase 455, when an event is triggered, the simulator provides a link to its parent event. The events tree in FIG. 5B may be represented as FIG. 5C. Based on this event tree, given any event which belongs to uvm_compo-nent, the simulator can find the component's root event "vcs_fgp_run_phase." For example, given the top event "t11", the simulator can traverse the tree to parent "t1" and eventually to the event "vcs_fgp_run_phase." Furthermore, given any event, the simulator can find its component via component tree 253 and then its component group via 230.

Once the FGP initialization phase 252 is done, the simulator logs memory accesses to evaluate possible thread data races. This is done by activating $fgp_data_access. Inside fgp_data_access, the simulator determines the event infor-mation of the current code according to the stack trace. The simulator then gets the component of the event. The simu-lator further determines the component group of the com-ponent. The simulator logs the memory access by recording [memory address, component group, access type (read or write)] into a database.

In additional, static variables and global variables are statically allocated at time zero of the simulation. Their addresses are fixed, so thread data race analysis and report-ing can be done at the end of simulation. However, class objects are dynamically created and deleted. The same address could be reused, which could generate a false alarm. Therefore, once the class object is released, the simulator collects the thread data race logs and then remove its records from the database.

For each memory address, if there are write/write or read/write operations from different component groups, it will be treated as a possible thread data race 490. A report of possible thread data races may include whether the conflict is for class object, global variable or static variable; the access type (read or write); the component and compo-nent group; and the stack trace of where the conflict hap-pens.

Figure 6A:
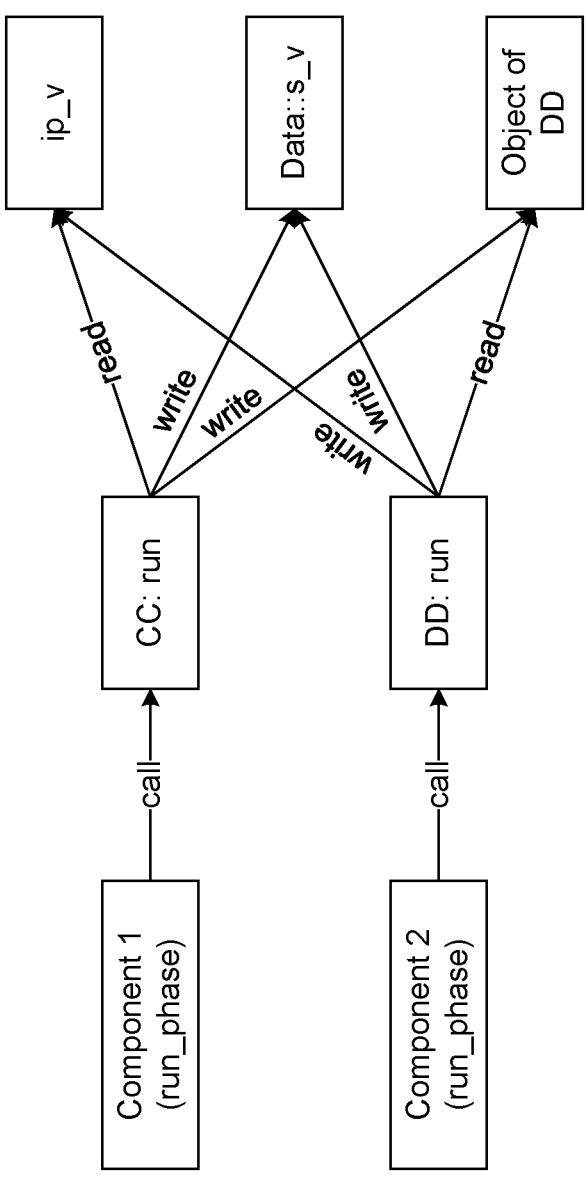
FIG. 6A is a block diagram illustrating a thread data race in accordance with some embodiments of the present disclosure.

FIG. 6A is a block diagram illustrating a thread data race in accordance with some embodiments of the present dis-closure. There are two uvm_components: "component1" and "component2." They are calling "CC::run" and "DD::run" in the run_phase accordingly. "CC" and "DD" are component names in this Verilog example. "ip_v" is a global variable, "Data" is a class name, and "Data::s_v" is the static member of the class. There is a thread data race between "CC::run" and "DD::run" as shown in FIG. 6A. A thread data race here means that two or more threads in a single process access the same memory location concurrently, and at least one of the accesses is for writing. The code for this example is given in Code listing 8. FIG. 6B shows an example conflict report.

Based on the above steps, the UVM testbench parallel mode is available for fine grained parallelism. However, the system Verilog code inside UVM components could intro-duce a thread data race.

Code Listing 9 is an example of a thread data race. There are two components "component1" and "component2." Without the testbench parallelism, the events order will be either "component1.t1( ) before component2.t1( )" or "component1.t1( ) after component2.t1( )." There is no race in this situation, because "user_component::tmp" is not accessed by two threads at the same time. However, with testbench parallelism, "component1.t1( )" and "component2.t1( )" will be invoked concurrently. This causes a thread data race in "user_component::tmp".

Thread data races may be synchronized using different techniques. In one approach, a thread lock is applied to a function or task. Pragma (* uvm_fgp_lock="<lock name>"*) could be added for any function/task or class of Verilog, and then pthread lock will be wrapped for the code under this function/task or class routines. The thread data race on "user_component::tmp" is solved by standard pthread lock which is automatically inserted by the compiler of simulation. Code listings 10A and 10B show the Verilog and corresponding simulation code for such an example.

As an alternative, the $uvm_fgp_lock/$uvm_fgp_unlock could be added for a piece of Verilog code, and the corre-sponding pthread lock will be added in the simulator, as shown in Code listings 11A and 11B.

Another solution is to add pragma (* uvm_fgp_atom *) for the simple type of Verilog, and all the operations on this simple type will be converted to standardized atomic memory access built-in functions, as shown in Code listings 12A and 12B.

A thread specific object is an object which will be shared only by the current thread. This avoids thread data race because different threads do not share objects. Code listing 13A shows a System Verilog class "uvm_fgp_thread_ob-ject" that contains an array pool of objects with parameter-ized type T. Its member method "get_wrapper( )" returns a thread specific object according to the current thread Id. A user can specify the content of T. One example of "class thread_specific_object" is given in Code listing 13B.

In race checker mode, all the UVM components are running in the master thread, so thread locks will have no effect. However, if the thread locks are ignored, then thread data races that have been resolved will appear as unresolved thread data races. Therefore, the thread locks are accounted for in race checker mode when determining whether the data is protected by lock.

Code listing 14 provides a simple example. There are two uvm_components: "component1" and "component2". Both of them access the same data "CC::s_i" concurrently, so there is potentially a thread data race. Without the lock "(*uvm_fgp_lock*)," the conflict between the "component1.run_phase" and "component2.run_phase" should be reported. However, the thread data race is resolved by the thread lock so no thread data race should be reported.

To account for this, the simulator maintains and tracks the active status of thread locks in race checker mode. Then fgp_data_access will know if the current code is under thread lock protection and the type of lock. If all the operations are protected by the same type of lock, then there is no race among them because the same type of lock ensures they are not executed at the same time.

Code listing 15 shows the implementation of "fgp_uvm_lock/fgp_uvm_unlock" in race checker mode. When executing "component1.access," the simulator first marks lock_status[type] as true, then calls fgp_data_access, and then unmarks lock_status[type]. This is component1 accessing the data "CC::s_i" by writing with the lock. The same happens in component2. Finally, the race checker recognizes that both component1 and component2 access the same data for writing but they are protected by the same lock. Then there is no thread data race.

Figure 7:
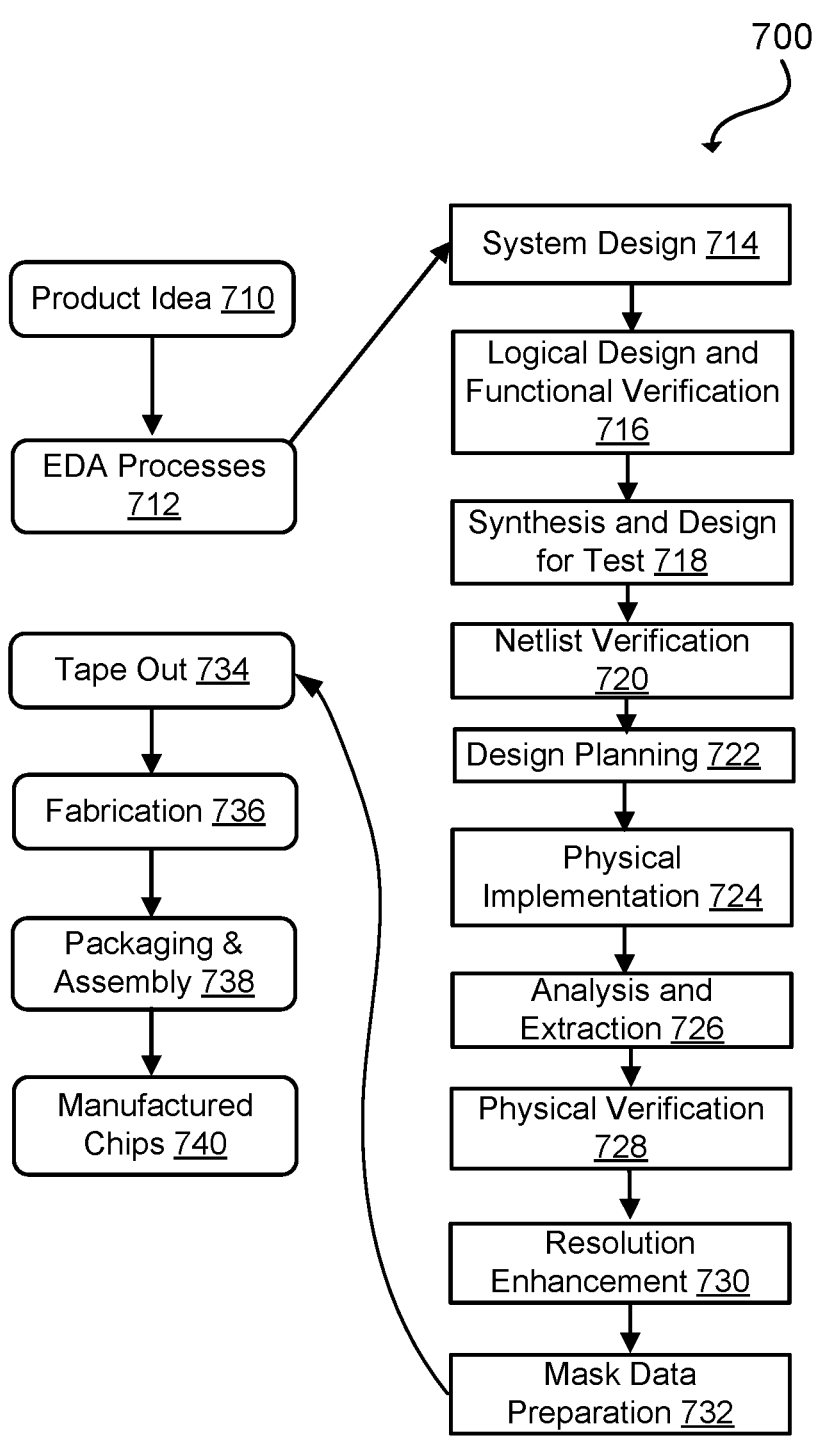
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 7. The processes described by be enabled by EDA products (or EDA systems).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
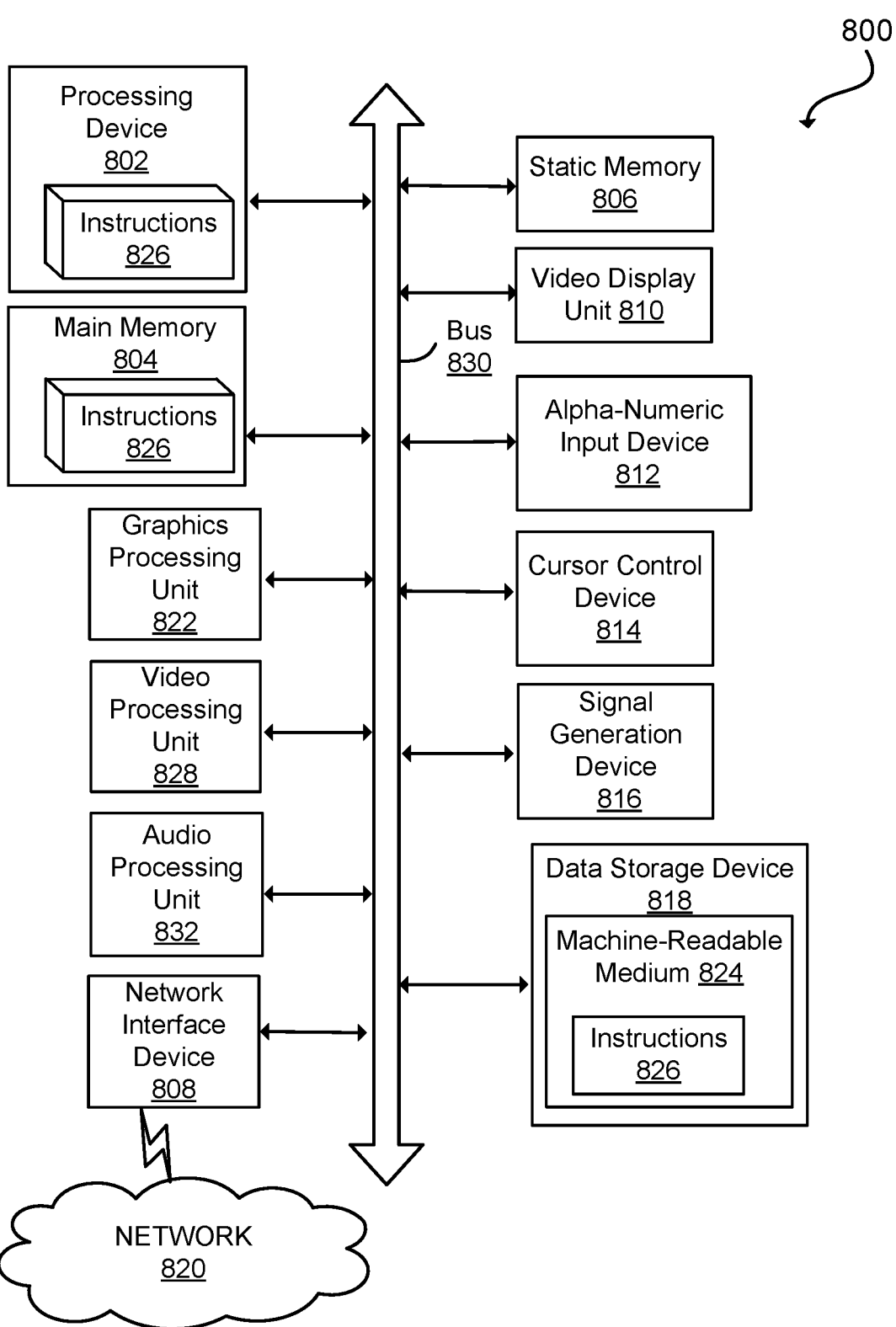
FIG. 8 depicts a diagram of an example computer system in which some embodiments of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

Part II. Code Listings

Code Listing 1: Example Configuration File Defining Component Groups

Component group:

<UVM component name>

. . .

Component group:

<UVM component name>

. . .

Exclusive component:

<UVM component name>

Code Listing 2: Implementation of Initialization Phase uvm_domain   dm=uvm_domain::get_common_domain( );

uvm_phase run=dm.find (uvm_run_phase::get( ));

dm.add (uvm_fgpinit_phase::get( ), null, null, run);

Code Listing 3: Class for Initialization Phase

```
class uvm_fgpinit_phase extends uvm_topdown_phase;
virtual function void execute (uvm_component comp, uvm_phase phase);
   int type_flag;
   if (!flag) begin
      flag = 1;
      traverse_all_component(comp);
   end
endfunction
function void traverse_all_component(uvm_component comp);
   string name;
   begin
      name = comp.get_name( );
      parent = comp.get_parent( );
      $fgpUvmComponentInfo(parent,comp,name);
      if (comp.get_first_child(name)) begin
         do
            this.traverse_all_component(comp.get_child(name));
         while (comp.get_next_child(name));
      end
   end
endfunction
endclass
```

Code Listing 4: Class for Nodes of a Component Tree class FgpUvmComponent {

FgpUvmComponent* parent_;

FgpUvmComponentV children_;

std::string name_;

unsigned long* comp_pointer_;

}

Code Listing 5: Multi-Threaded Run Phase

```
class uvm_run_phase extends uvm_task_phase;
virtual task exec_task;
   input uvm_component comp;
   input uvm_phase phase;
   begin
      fork
      comp.vcs_fgp_run_phase(phase);
      join
```

-continued

```
      end
   endtask
virtual class uvm_component extends uvm_report_object;
virtual task run_phase;
   ...
Endtask
task vcs_fgp_run_phase;
   input uvm_phase phase;
   begin
      this.run_phase(phase);
   end
endtask
```

Code Listing 6: Inheritance of Thread Index

```
class user_component extend uvm_component;
virtual task run_phase;
   fork
      t1( )
      t2( );
   join
   endtask
task t1( );
   fork
      t11( );
      t12( );
   join
   endtask
task t2( )
   fork
      t21( );
      t22( );
   join
   endtask
endclass
class user_component component1;
class user_component component2;
```

Code Listing 7A: Instrumenting a Static Variable

Class CC extends uvm_component;

static int s_i;

task run_phase( );

$fgp_data_access(s_i, write)

s_i=1;

endtask endclass

Code Listing 7B: Instrumenting a Global Variable

Int g_i;

Class CC extends uvm_component;

task run_phase( );

$fgp_data_access(s_i, write)

g_i=1;

endtask endclass

Code Listing 7C: Instrumenting a Class Object

Class DD;

Int data;

Function write_data(int d);

data=d;

endfunction

Endclass

ClassCC extends uvm_component;

DD dd;

task run_phase( );

$fgp_data_access(dd, write)

dd.write_data(1);

endtask endclass

Code Listing 8: Example of Thread Data Race

```
1
2          package vcs_fgp_user_pkg;
3            int ip_v;
4
5            class vcs_fgp_user_cc;
6              virtual function build( );
7              endfunction
8              virtual task run( );
9              endtask
10           endclass
11
12           class Data;
13             static ints_v;
14             static Data myself;
15             int v;
16             static function Data getData( );
17               if (!myself) begin
18                 myself = new;
19               end
20               return myself;
21             endfunction
22           endclass
23
24           Data data;
25
26           class CC extends vcs_fgp_user_cc;
27             Data my1;
28             function build( );
29               my1 = Data::getData( );
30             endfunction
31             task run( );
32               my1.v = ip_v;
33               //ip_v = 1;
34               Data::s_v = 1;
35             endtask
36           endclass
37
38           class DD extends vcs_fgp_user_cc;
39             Data my1;
40             int v;
41             function build( );
42     my1 = Data::getData( );
43           endfunction
44           task run( );
45               v= my1.v;
46               ip_v = 1;
47               Data::s_v = 1;
48               $display("v %d",v);
49               $display("ip_v %d",ip_v);
50               $display("s_v %d",Data:s_v);
51             endtask
52           endclass
53         endpackage
```

Code Listing 9: Example of Thread Data Race

```
class user_component extend uvm_component;
static int tmp;
int value;
virtual task run_phase;
  fork
    t1( )
    t2( );
  join
endtask
task t1( )
  tmp=value;
endtask
endclass
class user_component component1;
class user_component component2;
```

Code Listing 10A: Verilog Code for Thread Lock at Task Level

```
(* uvm_fgp_lock="t1")
task t1( )
    tmp=value;
    . . .
Endtask
```

Code Listing 10B: Simulation Code for Thread Lock at Task Level

```
task t1( )
{
Pthread lock;
tmp=value;
. . .
Pthread unlock;
}
```

Code Listing 11A: Verilog Code for Thread Lock of Code Region

```
task t1( )
    . . .
    $uvm_fgp_lock
    tmp=value;
    . . .
    $uvm_fgp_unlock
Endtask
```

Code Listing 11B: Simulation Code for Thread Lock of Code Region

```
task t1( )
{
. . .
Pthread lock;
tmp=value;
. . .
Pthread unlock;
}
```

Code Listing 12A: Verilog Code for Atomic Operations

```
(* uvm_fgp_atom *)
Int count;
task t1( )
    . . .
    count++;
endtask
```

Code Listing 12B: Simulation Code for Atomic Operations

```
task t1( )
{
. . .
_sync_add_and fetch(&count,1)
}
```

Code Listing 13A: System Verilog Thread-Specific Class

```
Class uvm_fgp_thread_object_base;
  static uvm_fgp_thread_object_base registeredObjs[$];
endclass
class uvm_fgp_thread_object#(type T = uvm_object) extends
uvm_fgp_thread_object_base;
'define MAX_FIXED_FGP_UVM_T_SIZE 16
  T faObjs ['MAX_FIXED_FGP_UVM_T_SIZE];
  function new( );
    for (int i = 0; i < 'MAX_FIXED_FGP_UVM_T_SIZE; i++) begin
      faObjs[i] = null;
    end
    uvm_fgp_thread_object_base::registeredObjs.push_back(this);
  endfunction
  function T get_wrapper( );
    T obj = null;
    int unsigned index = get_thread_index( );
    if (faObjs[index] == null) begin
      faObjs[index] = new;
```

-continued

```
          end
       else begin
          obj = faObjs[index];
       end
       return obj;
    endfunction
endclass
```

Code Listing 13B: Example Use of a Thread-Specific Class

```
    typedef class uvm_fgp_thread_object;
    class thread_specific_object;
       int depth;
       uvm_object uvm_global_copy_map[uvm_object];
       function new( );
          depth=0;
       endfunction
    endclass
    // the following line will be initialized at the time zero of
       simulation, it won't cause data thread race.
    static uvm_fgp_thread_object #(thread_specific_object)
       fgp_thread_obj=new;
    // the following line will get an object of thread_specifi-
       c_object which is thread specific
    thread_specific_objecttobj=fgp_thread_obj.get_
       wrapper( );
```

Code Listing 14: Example of a Resolved Thread Data Race.

```
    Class CC extends uvm_component;
    static ints_i;
    (* uvm_fgp_lock *)
    function access( );
       s_i=1;
    endfunction
    task run_phase( );
       access( );
    endtask
    endclass
    CC component1;
    CC component2;
```

Code Listing 15: Example of a Resolved Thread Data Race.

```
             Bool lock_status[lock_type];
             void fgp_uvm_lock(lock_type) {
                if (race checker mode) {
                   lock_status[lock_type] =true;
                }
                else {
                   pthread lock
                }
             }
             void fgp_uvm_unlock(lock_type) {
                if (race checker mode) {
                   lock_status[lock_type] =false;
                }
                else {
                   pthread unlock
                }
             }
```

What is claimed is:

1. A method comprising:

accessing a testbench for a design under test (DUT), the testbench comprising components used to verify functionality of the DUT through simulation of the DUT, wherein the components are grouped into component groups, and the components within an individual component group are executed on a same thread of the simulation;

executing the component groups on a single thread of the simulation, comprising logging accesses to memory by different component groups during the simulation;

identifying, by a processing device, based on the logged memory accesses from the simulation, whether any component groups create a thread data race in the simulation where component groups access same data in the simulation in a conflicting manner; and taking an action in response to identifying thread data races.

2. The method of claim 1 further comprising:

after taking the action, executing components from different component groups on different threads.

3. The method of claim 1 wherein:

executing the component groups on the single thread comprises executing events from the component groups on the single thread; and the logged memory accesses comprise one or more of: an address of the memory accessed, the component group for the event accessing the memory, and whether the access was a read type or a write type.

4. The method of claim 1 further comprising:

checking a value of a flag for logging accesses to memory; and determining whether to activate the logging accesses to the memory based on the value of the flag.

5. The method of claim 1 wherein identifying whether any component groups create a thread data race accounts for thread locks.

6. The method of claim 1 wherein executing the component groups on the single thread comprises: static allocation of global variables and static variables.

7. The method of claim 1 wherein executing the component groups on the single thread comprises: dynamic allocation of class objects, and collecting the logged memory accesses upon release of the class objects.

8. The method of claim 1 wherein the testbench is a UVM testbench, and the components comprise a plurality of Universal Verification Methodology (UVM) agents, UVM sequencers, UVM drivers and UVM monitors.

9. The method of claim 8 wherein, as a default, each UVM agent is assigned as a separate component group.

10. A system comprising a memory storing data and instructions and a processing device coupled with the memory and to execute the instructions; wherein the memory and processing device comprise:

a description of a design under test (DUT);

a testbench comprising components used to verify functionality of the DUT through simulation of the DUT; and a simulation environment that compiles the testbench and the DUT into executable code and runs the executable code; wherein running the executable code comprises:

an initialization phase that runs the executable code on a single thread of the simulation, logs memory accesses, and identifies thread data races in the simulation from the memory accesses where components access same data in the simulation in a conflicting manner; and a run phase that runs the executable code on multiple threads.

11. The system of claim 10 wherein compiling the testbench and the DUT into executable code comprises:

adding instrumentation to the executable code to log the memory accesses.

12. The system of claim 11 wherein the instrumentation is for memory accesses for static variables global variables, and class objects.

13. The system of claim 10 wherein the testbench further comprises a component tree that defines a hierarchy of the components in the testbench, and compiling the testbench and the DUT into executable code comprises:

adding instrumentation to the executable code to provide access to metadata sufficient to recreate and make the component tree available during the run phase.

14. The system of claim 13 wherein the metadata identifies components and their parent.

15. The system of claim 10 wherein the run phase further comprises:

identifying the component associated with an event to be dispatched;

identifying a component group for the identified component, wherein the components within an individual component group are executed on a same thread but components from different component groups may be executed on different threads;

identifying a thread for the identified component group; and dispatching the event for execution on the identified thread.

16. A non-transitory computer readable medium comprising stored instructions, which when executed by a processing device, cause the processing device to:

run executable code for a design under test (DUT) and corresponding testbench on a single thread of a simulation of the DUT, the testbench comprising components grouped into component groups;

log memory accesses from the executable code during the simulation, and identify thread data races where executable code from different component groups access same data in the simulation in a conflicting manner, the thread data races identified from the memory accesses from the simulation; and automatically take action relating to the identified thread data races.

17. The non-transitory computer readable medium of claim 16 wherein the executable code comprises a plurality of code modules, and the actions taken include thread locking code modules that generate the identified thread data races.

18. The non-transitory computer readable medium of claim 16 wherein the executable code comprises a plurality of code modules, and the actions taken include thread locking regions within code modules that generate the identified thread data races.

19. The non-transitory computer readable medium of claim 16 wherein the actions taken include converting operations relating to the identified thread data races to standardized atomic memory access built-in functions.

20. The non-transitory computer readable medium of claim 16 wherein the actions taken include generating thread specific objects to resolve the identified thread data races.

* * * * *